Sept. 25, 1945.  W. P. LEAR  2,385,630
VARIABLE DRIVE CONTROL
Filed Aug. 17, 1943
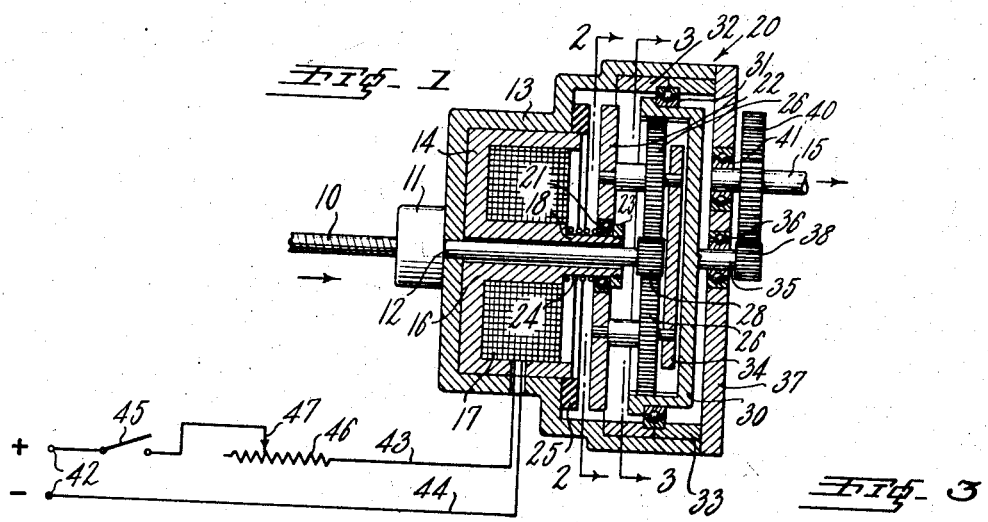
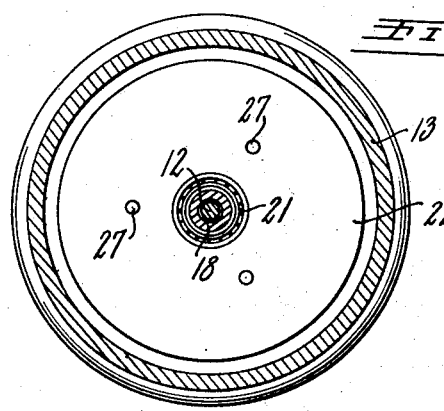
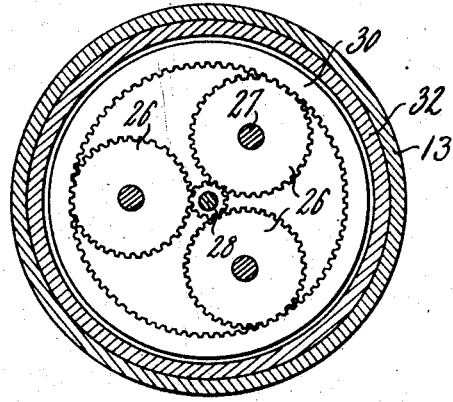
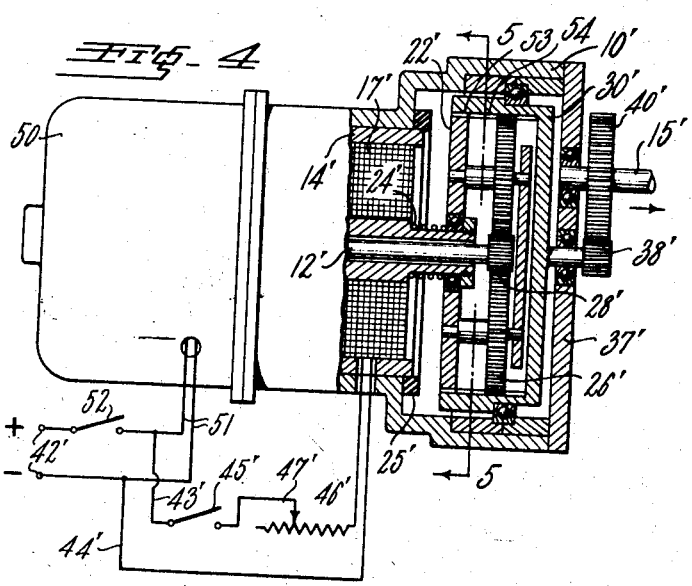
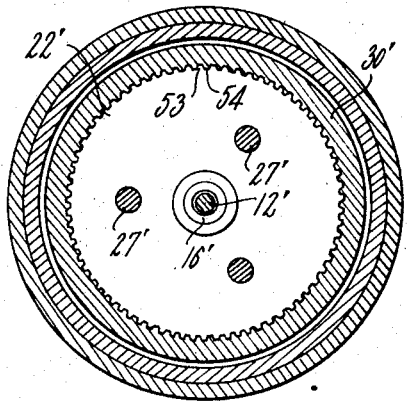
INVENTOR.
WILLIAM P. LEAR
BY Richard A. Marsen
ATTORNEY Patented Sept. 25, 1945

2,385,630

UNITED STATES PATENT OFFICE 2,385,630

VARIABLE DRIVE CONTROL

William P. Lear, North Hollywood, Calif., assignor, by mesne assignments, to Lear, Incorporated, Piqua, Ohio, a corporation of Illinois Application August 17, 1943, Serial No. 499,008

8 Claims. (Cl. 74—289)

This invention relates to a selective drive system, and more particularly to an electromagnetic clutch arrangement connecting a driving member to a driven member and varying the relative speeds thereof.

It is among the objects of the present invention to provide a selective driving system in which a driving member is connected to a driven member through gearing including a normally rotatable member, the rotation of which may be variably restrained to effect variations in the ratio of the speeds in the driven member and the driving member; to provide a selective driving system including planetary gearing and magnetically operative means for selectively restraining rotation of a member of such gearing; to provide a selective drive system including a normally rotatable member axially movable to effect different speed ratios between a driving member and a driven member, or to operatively disconnect the driving member from the driven member.

These and further objects, advantages and features of the invention will be apparent from the following description and accompanying drawing.

In the drawing:

Fig. 1 is an elevation view in section of one embodiment of the invention.

Fig. 2 is a vertical sectional view on the line 2—2 of Fig. 1.

Fig. 3 is a vertical sectional view on the line 3—3 of Fig. 1.

Fig. 4 is an elevation view, partly in section, of another embodiment of the invention.

Fig. 5 is a vertical sectional view on the line 5—5 of Fig. 4.

Referring to the embodiment of the invention shown in Figs. 1, 2 and 3, a driving member 10, such as flexible shafting, is arranged to drive a driven member 15, such as rigid shafting, through the medium of a selective drive system 20. Flexible shafting 10 is connected through a coupling 11 to shaft 12 mounted in an annular housing 13. Also mounted in housing 13 is an annular cup-shaped member 14 of magnetic material having a hub portion 16 surrounding shaft 12. A magnetizing winding 17 is mounted in annular member 14. Hub portion 16 has a reduced outer end 18 on which is a ball bearing 21 supporting a movable mounting member 22 of magnetic material. Mounting member 22 forms part of a planetary gearing arrangement for connecting shaft 10 to shaft 15, and is urged outwardly on extension 18 against a nut 23 by a spring 24. For a purpose to be described hereinafter, a braking surface 25 is mounted in housing 13 adjacent annular member 14. A plurality of planetary pinions, in the present instance three in number, are rotatably mounted on member 22. As shown in Fig. 2, each pinion is provided with a shaft 27 having one end rotatably mounted in member 22. The opposite ends of shafts 27 are secured in a suitable plate or disk 34.

Referring to Fig. 3, each pinion 26 engages a driving pinion 28 on the end of shaft 12 and an internal ring gear 30 mounted in housing 13. Ring gear 30 is mounted in bearing 31 which is secured in recesses in plates 32 and 33 set into housing 13, and is provided with a shaft 35 mounted in bearing 36 in end wall 37 of housing 13. A pinion 38 on the end of shaft 35 meshes with a spur gear 40 on shaft 15. Shaft 15 is rotatably supported in bearing 41 in end plate 37.

The magnetizing winding 17 may be energized from a suitable source of electric current 42 through conductors 43 and 44. Conductor 44 extends directly from source 42 to the magnetizing winding 17. A disconnecting switch 45 and a rheostat 46 having a contact arm 47, are in series with conductor 43. By the described arrangement, the magnetizing winding may be energized through closure of switch 45. The strength of the magnetic field may be varied through adjustment of contact arm 47 along rheostat 46 to vary the current flow through winding 17.

When switch 45 is open, and shaft 10 is rotating, no motion will be transmitted to shaft 15. The pinion 28 will cause rotation of planetary pinions 26. However, the mounting member 22 is free to rotate, so the planetary pinions 26 impart no motion to ring gear 30. If switch 45 is now closed, member 22 is urged into engagement with braking surface 25. Under such conditions, pinion 28 rotates ring gear 30 through pinions 26. Thus pinion 38, gear 40 and shaft 15 will be driven. By suitable control of the strength of the magnetic field through adjustment of rheostat 46, the force with which member 22 is urged into engagement with braking surface 25 may be varied. Thus, the member 22 may be held in movement restraining frictional contact with braking surface 25 or may be controlled so as to slip with respect thereto. By controlling the amount of slippage, the ratio between the speeds of driving member 10 and driven member 15 may be varied over a wide range.

In the embodiment of the invention illustrated in Figs. 4 and 5, corresponding elements have been indicated by corresponding reference characters primed. In this embodiment of the invention, the driving system of the invention is connected to an electric motor 50 which may be energized from source 42' through conductors 51 connected in parallel with conductors 43', 44'. A disconnecting switch 52 is provided to control the energization of both motor 50 and magnetizing winding 17'. Energization of magnetizing winding 17' is controlled in the same manner as in Figs. 1, 2 and 3 through disconnecting switch 45', rheostat 46' and adjustable contact 47'. In this embodiment of the invention, internal ring gear 30' is made to extend axially a greater distance. Mounting member 22' is formed as a spur gear having teeth 53 adapted to engage the teeth 54 on ring gear 30' as shown in Fig. 5. The other elements of the device are the same as previously described.

The variation in the ratio of the speeds of driving member 15' with respect to those of shaft 12' is accomplished by varying the energization of magnetizing winding 17'. However, when the magnetizing winding 17' is totally deenergized, spring 24 will urge member 22' into engagement with gear 30'. This provides a direct reverse drive. At an intermediate energization value of magnetizing winding 17', member 22' is held out of engagement with both braking surface 25' and gear 30'. There is thus no driving effected between shaft 12' and shaft 15', as member 22' is free to rotate. Upon increased energization of winding 17', member 22' is urged into engagement with braking surface 25', and pinion 28' drives ring gear 30' through pinions 26'. The slippage between brake surface 25' and member 22' may be controlled by varying the strength of the magnetic field through adjustment of rheostat 46' to effect infinite variation of the speed ratio of shaft 15' and shaft 12'.

While specific embodiments of the invention have been shown and described to illustrate the application of the principles thereof, it will be understood that the invention may otherwise be embodied without departing from such principles.

What I claim is:

1. A drive system comprising a housing; a member mounted in said housing and having an elongated hub portion; a braking surface mounted in said housing; a driving shaft extending through said hub portion; a driving pinion on the extended end of said driving shaft; a pinion mounting plate rotatably mounted on said elongated hub portion; an internal ring gear mounted on a bearing secured in said housing; a plurality of planetary pinions rotatably mounted on said mounting plate and engaging said driving pinion and said ring gear; and means for urging said plate into frictional engagement with said surface and controlling the slippage between said plate and surface to vary the ratio of the speed of said ring gear to that of said driving pinion.

2. A drive system comprising a housing; a member mounted in said housing and having an elongated hub portion; a braking surface mounted in said housing; a driving shaft extending through said hub portion; a driving pinion on the extended end of said driving shaft; a pinion mounting plate rotatably mounted on an anti-friction bearing on said elongated hub portion; an internal ring gear mounted in said housing; a plurality of planetary pinions rotatably mounted on said mounting plate and engaging said driving pinion and said ring gear; resilient means engaging a shoulder on said hub portion and said anti-friction bearing and normally biasing said mounting plate away from said braking surface; and means for urging said plate into frictional engagement with said surface and controlling the slippage between said plate and surface to vary the ratio of the speed of said ring gear to that of said driving pinion.

3. A drive system comprising a housing; a member mounted in said housing and having an elongated hub portion; a braking surface mounted in said housing; a driving shaft extending through said hub portion; a driving pinion on the extended end of said driving shaft; a pinion mounting gear rotatably mounted on said elongated hub portion; an internal ring gear mounted in said housing; a plurality of planetary pinions rotatably mounted on said mounting plate and engaging said driving pinion and said ring gear; resilient means normally biasing said mounting gear away from said braking surface and into engagement with said ring gear; and means for urging said mounting gear into frictional engagement with said surface and controlling the slippage between said mounting gear and surface to vary the ratio of speed of said ring gear to that of said driving pinion.

4. A drive system comprising a housing; a cup-shaped member of magnetic material fixedly mounted in said housing and having an elongated hub portion; a braking surface mounted in said housing adjacent said cup-shaped member; a driving shaft extending through said hub portion; a driving pinion on the extended end of said driving shaft; a pinion mounting plate rotatably mounted on said elongated hub portion; a magnetizing winding mounted in said cup-shaped member; an internal ring gear mounted in said housing; a plurality of planetary pinions rotatably mounted on said mounting plate and engaging said driving pinion and said ring gear; and electric circuit means for energizing said winding to create a magnetic circuit including said cup-shaped member and said mounting plate to urge said cup-shaped member into frictional engagement with said braking surface.

5. A drive system comprising a housing; a cup-shaped member of magnetic material fixedly mounted in said housing and having an elongated hub portion; a braking surface mounted in said housing adjacent said cup-shaped member; a driving shaft extending through said hub portion; driving pinion on the extended end of said driving shaft; a pinion mounting plate rotatably mounted on said elongated hub portion; a magnetizing winding mounted in said cup-shaped member; an internal ring gear mounted in said housing; a plurality of planetary pinions rotatably mounted on said mounting plate and engaging said driving pinion and said ring gear; resilient means normally urging said mounting plate away from said braking surface; and electric circuit means for energizing said winding to create a magnetic circuit including said cup-shaped member and said mounting plate to urge said cup-shaped member into frictional engagement with said braking surface.

6. A drive system comprising a housing; a cup-shaped member of magnetic material fixedly mounted in said housing and having an elongated hub portion; a braking surface mounted in said housing adjacent said cup-shaped member; a driving shaft extending through said hub portion; a driving pinion on the extended end of said driving shaft; a pinion mounting plate rotatably mounted on said elongated hub portion; a magnetizing winding mounted in said cup-shaped member; an internal ring gear mounted in said housing; a plurality of planetary pinions rotatably mounted on said mounting plate and engaging said driving pinion and said ring gear; electric circuit means for energizing said winding to create a magnetic circuit including said cup-shaped member and said mounting plate to urge said cup-shaped member into frictional engagement with said braking surface; and means for varying the energization of said magnetizing winding to control the slippage between said mounting plate and said braking surface to control the speed ratio of said driving pinion and driven member.

7. A drive system comprising a housing; cup-shaped member of magnetic material fixedly mounted in said housing and having an elongated hub portion; a braking surface mounted in said housing adjacent said cup-shaped member; a driving shaft extending through said hub portion; a driving pinion on the extended end of said driving shaft; a pinion mounting plate rotatably mounted on said elongated hub portion; a magnetizing winding mounted in said cup-shaped member; an internal ring gear mounted in said housing; a plurality of planetary pinions rotatably mounted on said mounting plate and engaging said driving pinion and said ring gear; resilient means normally urging said mounting plate away from said braking surface; electric circuit means for energizing said winding to create a magnetic circuit including said cup-shaped member and said mounting plate to urge said cup-shaped member into frictional engagement with said braking surface; and means for varying the energization of said magnetizing winding to control the slippage between said mounting plate and said braking surface to control the speed ratio of said driving pinion and driven member.

8. A drive system comprising a housing; a cup-shaped member of magnetic material mounted in said housing and having an elongated hub portion; a braking surface mounted in said housing adjacent said cup-shaped member; a driving shaft extending through said hub portion; a driving pinion on the extended end of said driving shaft; a pinion mounting gear rotatably mounted on said elongated hub portion; a magnetizing winding mounted in said cup-shaped member; an internal ring gear mounted in said housing; a plurality of planetary pinions rotatably mounted on said mounting plate and engaging said driving pinion and said ring gear; resilient means normally urging said mounting gear away from said braking surface and into engagement with said ring gear; and electric circuit means for energizing said winding to create a magnetic circuit including said cup-shaped member and said mounting plate to urge said cup-shaped member into frictional engagement with said braking surface.

WILLIAM P. LEAR.